United States Patent
Ben-Moshe et al.

(10) Patent No.: US 10,477,356 B2
(45) Date of Patent: Nov. 12, 2019

(54) NAVIGATION METHOD AND DEVICE

(71) Applicant: Ariel-University Research and Development Company Ltd., Ariel (IL)

(72) Inventors: Boaz Ben-Moshe, Herzlia (IL); Nir Shvalb, Nesher (IL)

(73) Assignee: Ariel-University Research and Development Company Ltd., Ariel (IL)

( * ) Notice: Subject to any disclaimer, the term of this patent is extended or adjusted under 35 U.S.C. 154(b) by 0 days.

(21) Appl. No.: 14/418,106

(22) PCT Filed: Jul. 30, 2013

(86) PCT No.: PCT/IB2013/056267
§ 371 (c)(1),
(2) Date: Jan. 29, 2015

(87) PCT Pub. No.: WO2014/020547
PCT Pub. Date: Feb. 6, 2014

(65) Prior Publication Data
US 2015/0237481 A1 Aug. 20, 2015

Related U.S. Application Data

(60) Provisional application No. 61/677,495, filed on Jul. 31, 2012.

(51) Int. Cl.
*H04W 4/029* (2018.01)
*G01S 1/70* (2006.01)
(Continued)

(52) U.S. Cl.
CPC ............... *H04W 4/029* (2018.02); *G01S 1/70* (2013.01); *G01S 5/163* (2013.01); *H04W 4/023* (2013.01);
(Continued)

(58) Field of Classification Search
CPC ..... H04W 4/008; H04W 4/023; H04W 4/027; H04W 4/043; H04W 84/12; G01S 1/70; G01S 5/163
See application file for complete search history.

(56) References Cited

U.S. PATENT DOCUMENTS 5,642,106 A 6/1997 Hancock et al.
5,961,571 A 10/1999 Gorr et al.
(Continued)

FOREIGN PATENT DOCUMENTS

EP 1983397 10/2008
WO WO 2014/020547 2/2014

OTHER PUBLICATIONS

International Preliminary Report on Patentability dated Feb. 12, 2015 From the International Bureau of WIPO Re. Application No. PCT/IB2013/056267.
(Continued)

*Primary Examiner* — Frantz Bataille (57) ABSTRACT

Disclosed are methods, assemblies and devices useful for identifying the location and/or motion of a mobile device in a specified area, for assisting in mapping a specified area and also to methods, assemblies and devices for determining a location of anchors found at fixed locations in a specified area.

23 Claims, 7 Drawing Sheets

(51) Int. Cl.
  *G01S 5/16* (2006.01)
  *H04W 4/80* (2018.01)
  *H04W 4/02* (2018.01)
  *H04W 4/021* (2018.01)
  *H04W 84/12* (2009.01)

(52) U.S. Cl.
  CPC ............ *H04W 4/027* (2013.01); *H04W 4/80* (2018.02); *H04W 4/021* (2013.01); *H04W 4/026* (2013.01); *H04W 84/12* (2013.01)

(56) References Cited

U.S. PATENT DOCUMENTS

| | | | |
|---|---|---|---|
| 2004/0167670 A1 | 8/2004 | Goncalves et al. | |
| 2005/0213082 A1* | 9/2005 | DiBernardo | G01S 5/163 356/139.03 |
| 2005/0222918 A1* | 10/2005 | Vanska | G06F 8/62 455/419 |
| 2006/0088187 A1 | 4/2006 | Clarkson et al. | |
| 2008/0082258 A1* | 4/2008 | Pham | G01C 21/20 701/434 |
| 2009/0237379 A1* | 9/2009 | Lawrenz | G06F 1/1607 345/204 |
| 2010/0179786 A1* | 7/2010 | Lee | G01B 11/03 702/150 |
| 2011/0201360 A1* | 8/2011 | Garrett | G01S 5/0027 455/457 |
| 2011/0246945 A1* | 10/2011 | Caine | H04N 7/17318 715/835 |
| 2012/0176525 A1* | 7/2012 | Garin | G01C 21/20 348/333.02 |
| 2012/0184219 A1* | 7/2012 | Richardson | G01S 5/0036 455/67.11 |
| 2013/0141554 A1* | 6/2013 | Ganick | G01S 1/70 348/61 |
| 2015/0179088 A1* | 6/2015 | Raman et al. | G09B 21/001 348/62 |

OTHER PUBLICATIONS

International Search Report dated Nov. 18, 2013 From the International Searching Authority Re. Application No. PCT/IB2013/056267.

Written Opinion dated Nov. 18, 2013 From the International Searching Authority Re. Application No. PCT/IB2013/056267.

Bleser et al. "Advanced Tracking Through Efficient Image Processing and Visual-Inertial Sensor Fusion", Proceedings of the IEEE Virtual Reality Conference, VR '08, Reno, Nevada, USA, Mar. 8-12, 2008. p. 137-144, Mar. 12, 2008. p. 138, 1st Para, p. 144, Fig.10, p. 142, Fig.6.

Davison et al. "MonoSLAM: Real-Time Single Camera SLAM", IEEE Transactions on Pattern Analysis and Machine Intelligence, 29(6): 1052-21067, Published Online Jan. 18, 2007.

Se et al. "Local and Global Localization for Mobile Robots Using Visual Landmarks", Proceedings of the 2001 IEEE/RSJ International Conference on Intelligent Robots and Systems, IROS '01, Maui, Hawaii, USA, Oct. 29-Nov. 3, 2001, p. 414-420, Nov. 3, 2001.

* cited by examiner

NAVIGATION METHOD AND DEVICE

RELATED APPLICATIONS

This application is a National Phase of PCT Patent Application No. PCT/IB2013/056267 having International filing date of Jul. 30, 2013, which claims the benefit of priority under 35 USC § 119(e) of of U.S. Provisional Patent Application No. 61/677,495 filed on Jul. 31, 2012. The contents of the above applications are all incorporated by reference as if fully set-forth herein in their entirety.

FIELD AND BACKGROUND OF THE INVENTION

The invention, in some embodiments, relates to the field of mapping and location determination, and more particularly, but not exclusively, to methods, assemblies and devices useful for identifying the location and/or motion of a mobile device in a specified area, for assisting in mapping a specified area and also to methods, assemblies and devices for determining a location of anchors found at fixed locations in a specified area.

There is often a need to determine the location of an object found in a specified area with great accuracy. For example, in the field of Location-Based Services (LBS), it is often required to known the location of a person with great accuracy.

An inertial navigation system (INS) is a navigation aid that uses a processor and various sensors to continuously calculate the position, orientation, and velocity of a moving object without the need for external references. INS is often used on vehicles such as ships, aircraft, submarines, guided missiles, and spacecraft.

Simultaneous localization and mapping (SLAM), is a technique used to generate a map of an unknown environment, or to update and improve a map of a known environment, while at the same time keeping track of the current location of a device generating the map. In typical known implementations of SLAM, landmarks are used to identify a relative position of the device within the area, and optionally then calculate the distance of the device from such landmarks. The utility of known SLAM techniques is limited in an indoor environment due to the lack of suitable landmarks.

SUMMARY OF THE INVENTION

The invention, in some embodiments, relates to the field of mapping and location determination, and more particularly, but not exclusively, to methods, assemblies and devices useful for assisting in accurately identifying the location and/or motion of a mobile device in a specified area and for mapping anchors in the specified area. In some embodiments, the method is used starting from a known landmark at a well-defined position in the specified area, such as a doorway or other clearly-identifiable object.

In some embodiments, the invention relates to methods and devices useful for assisting in accurately determining motion and/or location of an object indoors, using a Simultaneous Location and Mapping (SLAM) algorithm utilizing light sources as anchors.

In some embodiments, the invention includes using a mobile device having a known three-dimensional orientation (pitch, yaw, and roll) and moving at a known velocity, to obtain images of anchors in a specified area. In some embodiments, the distance from the mobile device to each of the anchors is calculated at different time points using registration between multiple images of the same anchors taken at the different time points, thereby computing the distance and the direction traveled between the different time points.

In some embodiments, the invention includes using a mobile device to identify a landmark in the specified area, and to compute an own location in the specified area based on its computed motion relative to the landmark. In some embodiments, the landmark is identified in an acquired image, and/or is identified by receipt of a signal from the landmark, such as a Wi-Fi signal or a sound signal.

Thus, in accordance with an aspect of some embodiments of the invention, there are provided methods for determining the location and/or the motion of a mobile device in a specified area, comprising:

from an imaging element forming part of a mobile device, at an imaging rate, capturing at least two images of a portion of a specified area at different time points; in each of the at least two captured images, identifying at least two anchors, located in the portion of the specified area, that are found in the at least two captured images;

processing the at least two images to identify changes in relative locations of the at least two identified anchors within the at least two images;

from an orientation-measurement element forming part of the mobile device, determining a three-dimensional orientation of the mobile device;

using data received from at least one of a velocity-sensing element of the mobile device and a direction-sensing element of the mobile device, determining a motion vector for the mobile device; and based on the identified changes in relative locations of the at least two identified anchors within the at least two images, the motion vector, and the orientation of the mobile device, computing at least one of:
a location of the mobile device in the specified area, and
a distance and a direction travelled by the mobile device.

In some embodiments, the mobile device comprises (and in some embodiments is) a suitably-configured wearable mobile device, configured to be worn on the body of a user, such as a smart watch, smart eyeglasses and/or virtual reality eyeglasses such as Google Glass® commercially available from Google® Inc. of Mountain View, Calif., USA, smart jewelry, a pen including a camera, or any other suitable wearable mobile device.

In some embodiments, the device comprises (and in some embodiments is) a suitably-configured handheld mobile device selected from the group consisting of a cellular telephone, a smart phone, a laptop computer, a tablet computer, a Personal Digital Assistant (PDA), a music player, a gaming console, and virtual-reality glasses.

In some embodiments, the mobile device comprises (and in some embodiments is) a suitably-configured mobile vehicle, in some embodiments an unmanned vehicle, in some embodiments a mobile vehicle configured to operate indoors. In some embodiments, the mobile device comprises (and in some embodiments is) a suitably-configured mobile vehicle selected from the group consisting of a terrestrial vehicle (e.g., car, truck, motorcycle, train), an aerial vehicle (e.g., airplane, helicopter, glider, lighter-than-air aircraft (aerostat), drone, UAV); a water vehicle (surface vessel, submersible vessel), other vehicle (hovercraft, seaplane, amphibious vehicle) and robot (e.g., a robotic vacuum cleaner). In some embodiments, the suitably-configured mobile vehicle is small. In some embodiments, the suitably-configured mobile vehicle is a toy.

In some embodiments, at least one, more than one and in some embodiments all, of the processing of the at least two images, the determining the three-dimensional orientation, the determining a motion vector, and the computing the location and/or the distance and direction, are carried out at a location remote from the mobile device by a processor functionally associated with the mobile device. In some such embodiment, the method also includes transmitting one or more inputs for calculation selected from the group consisting of the images, the three-dimensional orientation, the data received from the velocity-sensing element and/or the direction-sensing element, from the mobile device to the remote location.

In some such embodiments, the transmitting comprises transmitting the one or more inputs for calculation from the mobile device to the remote location using a suitable communication method. The communication method may be any suitable communication method, including wired communication methods such as communication over a Wide Area Network (WAN) or a Local Area Network (LAN), or a wireless communication method such as communication using (ultra)sonic communication, infrared communication, over a Wi-Fi network (e.g., in a Wi-Fi session), Bluetooth® communication protocol, and communication using wireless telephony methods such as GSM, 2G, 3G, and 4G.

In some embodiments, the remote location comprises a remote server. In some embodiments, the remote location comprises a mobile processing device. For example, in some embodiments, the mobile device including the imaging element comprises smart glasses, and the remote location comprises a smart phone including a processor.

The imaging element may be any suitable imaging element operating at any suitable imaging rate. That said, in some embodiments, the imaging element comprises a still camera. In some embodiments, the imaging element comprises a video camera. In some embodiments, the imaging rate is not slower than 10 frames per second. In some embodiments, the imaging rate is not slower than 20 frames per second, not slower than 30 frames per second, not slower than 40 frames per second, not slower than 50 frames per second, or even not slower than 100 frames per second.

In some embodiments, the portion of the specified area of which the two images are captured includes a ceiling of the specified area, and the imaging element captures images of at least part of the ceiling of the portion of the specified area.

In some embodiments, the anchors comprise light sources located in the specified area. In some embodiments, the light sources are located on the ceiling of the specified area. In some embodiments, the light sources are located on the walls of the specified area.

In some embodiments, identifying anchors comprises identifying at least three, at least four, at least five, or even ten anchors or more in each of the at least two captured images.

In some embodiments, identifying anchors comprises identifying the same at least two anchors in each of the at least two captured images. In some embodiments, identifying anchors comprises identifying the same at least two anchors in at least three, at least four, at least five, and even in at least ten images captured by the imaging element.

In some embodiments, identifying anchors comprises using edge-detection methods. In some embodiments, identifying anchors comprises using brightness-detection methods, such as brightest pixel detection and/or darkest pixel detection.

In some embodiments, processing the at least two images to identify changes in relative locations of the at least two identified anchors comprises employing image-registration methods for identifying the changes in relative location and/or the motion vector of the device.

In some embodiments, the orientation-measurement element comprises a gyroscope. In some embodiments, the three-dimensional orientation is defined in terms of at least one of yaw, pitch, and roll of the mobile device. In some embodiments, the three-dimensional orientation is defined in a three-axis environment as angular distances from the X, Y, and Z, axes of a Cartesian coordinate system.

In some embodiments that include a velocity-sensing element, the velocity-sensing element comprises an accelerometer. In some embodiments, the velocity-sensing element comprises a pedometer functionally associated with a clock.

In some embodiments that include a direction-sensing element, the direction-sensing element comprises a compass. In some embodiments, the direction-sensing element comprises a gyroscope. In some embodiments, the direction-sensing element comprises an optic flow sensor.

In some embodiments, the data received from at least one of a velocity-sensing element of the mobile device and a direction-sensing element of the mobile device used to determine a motion vector for the mobile device comprises at least one of a velocity of the mobile device, and a direction of motion of the mobile device. In some embodiments, the motion vector comprises a velocity and a direction of motion of the mobile device.

In some embodiments, computing the distance and the direction traveled by the mobile device comprises computing the distances between the mobile device and each of the identified anchors in each of the at least two images based on the three-dimensional orientation of the mobile device, and based on changes in the computed distances, identifying location and/or the direction and the distance traveled by the device.

In some embodiments, each of the at least two images is captured when the imaging element is at a different three-dimensional orientation. In some such embodiments, the computing is takes into consideration the three-dimensional orientation at the time of capturing each of the images.

It is a particular feature of embodiments of the teachings herein that changes in the orientation of the imaging element during operation thereof, and particularly between the at least two images, assist in identification of the location of the mobile device by breaking the symmetry between the anchors. For example, in many indoor locations, such as stores e.g. supermarkets, light sources used as anchors are symmetric and are placed in the same positions in each of the aisles in the store. A change in the three-dimensional orientation of the mobile device and the imaging element when capturing the at least two images, allows for a different set of anchors (such as light sources), to be seen in each of the images, thereby breaking the symmetry between the images and enabling computation of the exact aisle in which the mobile device is located.

In some embodiments, the specified area is delineated (e.g., by walls and/or fences). In some embodiments, the specified area is not delineated. The dimensions of the specified area are any suitable dimensions, In some embodiments, dimensions of the specified area are between 9 square meters and 200,000 square meters. In some embodiments, dimensions of the specified area are between 9 square meters and 90,000 square meters.

In some embodiments, the mobile device comprises (and in some embodiments is) an unmanned, autonomous or robotic vehicle such as an unmanned terrestrial vehicle or unmanned aerial vehicle, and the specified area comprises a volume (e.g., room) in which the vehicle is moving.

In some embodiments, the mobile device comprises (and in some embodiments is) a vehicle (manned or unmanned), and the specified area comprises a tunnel through which the vehicle is travelling.

In some embodiments, a vertical distance between the mobile device and a surface on which the anchors are mounted, such as the ceiling of the specified area, is between 1 and 100 meters.

In some embodiments, the distance traveled by the device within the specified area is computed to an accuracy of 10 cm or less per calculation cycle.

In some embodiments, the location of the device within the specified area is computed to an accuracy of 10 cm or less per calculation cycle.

In some embodiments, the method also includes storing the locations of identified anchors and thereby creating a map of the anchors in the specified area. In some such embodiments, the method includes accessing a mapping database for storing the created map of the anchors in the database.

In some such embodiments, the method also includes uploading the locations of the identified anchors and/or created map of the identified anchors to a remote location. In some such embodiments, uploading the locations and/or the created map comprises wirelessly transmitting the map to the remote location using any suitable wireless communication method, including (ultra)sonic, infrared, Wi-Fi, Bluetooth®, and wireless telephony protocols such as GSM, 2G, 3G, and 4G.

In some embodiments, the method includes obtaining a map of anchors located in the specified area. In some such embodiments, obtaining a map of anchors comprises wirelessly receiving the map from different mobile device which has already mapped the anchors. In some such embodiments, obtaining a map of anchors comprises downloading the map from a remote location such as a mapping database where the map is stored. In some such embodiments, the creating of the map of the anchors in the specified area comprises updating an obtained map of the anchors, thereby potentially improving future computations based on the map.

In some embodiments, the method also includes identifying a landmark in the specified area. In some such embodiments, the landmark is an easily identifiable element which allows the position of the mobile device to be accurately calculated. For example, the landmark may be a unique arrangement of anchors or a geographical landmark found in an image.

In some such embodiments, in addition to computing the direction and distance traveled by the mobile device, the method also includes computing the location of the mobile device relative to the identified landmark. In some embodiments, the identifying a landmark comprises identifying the landmark prior to capturing the images.

In some embodiments, identifying a landmark comprises identifying the landmark in one of the at least two images. In some embodiments, identifying a landmark comprises processing one or more images to identify the landmark, such as by scanning and decoding a Quick Response (QR) code located at the landmark or processing an image to identify a unique aspect of the environment at the landmark, such as a unique chandelier. In some embodiments, identifying a landmark comprises receiving a signal indicating presence at or near the landmark. For example, the landmark may be a Wi-Fi access point, such that identifying the landmark comprises receiving a beacon from the Wi-Fi access point at the landmark. As another example, the landmark may be identified by receipt of an RF or Bluetooth® signal by the mobile device.

In some embodiments, the method also includes displaying the computed location and/or distance and velocity to a user, for example overlaid on a map of the specified area. Typically, such displaying is to the human operator (i.e., user) of the mobile device. In some embodiments, in which computing the location and/or distance and direction is carried out by the mobile device, the method also includes transmitting the computed location and/or distance and direction to a remote location. In some such embodiments, the remote location is a server for providing information to a user of the mobile device in the specified area, such as advertising information.

According to an aspect of some embodiments of the present invention, there also provided assemblies suitable for determining a location of a mobile device in a specified area, comprising:
 a mobile device including:
  an imaging element configured to capture, at an imaging rate, at least two images of a portion of a specified area at different time points;
  an orientation-measurement element configured to determine a three-dimensional orientation of the mobile device; and
  at least one of a velocity-sensing element configured to determine a velocity of motion of the mobile device and a direction-sensing element configured to determine a direction of motion of the mobile device; and
 a processing unit, functionally associated with the mobile device, and comprising a processor configured to:
  in each the image, identify at least two anchors located in the portion of the specified area;
  process the at least two images to identify changes in locations of at least two identified anchors in at least two images;
  based on data received from at least one of the optional velocity-sensing element and the optional direction-sensing element, determine a motion vector for the mobile device; and
  based on the identified changes in locations of at least two identified anchors in at least two images, the motion vector, and the orientation, compute at least one of a location of the mobile device in the specified area and a distance and a direction travelled by the mobile device.

In some embodiments, the mobile device comprises a (and in some embodiments is) a suitably-modified wearable mobile device, configured to be worn on the body of a user, such as a smart watch, smart eyeglasses and/or virtual reality eyeglasses such as Google Glass® commercially available from Google® Inc. of Mountain View, Calif., USA, smart jewelry, a pen including a camera, or any other suitable wearable mobile device.

In some embodiments, the mobile device comprises (and in some embodiments is) a suitably-configured mobile vehicle, in some embodiments an unmanned vehicle, in some embodiments a mobile vehicle configured to operate indoors. In some embodiments, the mobile device comprises (and in some embodiments is) a suitably-configured mobile vehicle selected from the group consisting of a terrestrial vehicle (e.g., car, truck, motorcycle, train), an aerial vehicle (e.g., airplane, helicopter, glider, lighter-than-air aircraft (aerostat), drone, UAV); a water vehicle (surface vessel, submersible vessel), other vehicle (hovercraft, seaplane, amphibious vehicle) and robot (e.g., a robotic vacuum cleaner). In some embodiments, the suitably-configured mobile vehicle is small. In some embodiments, the suitably-configured mobile vehicle is a toy.

In some embodiments, the device comprises (and in some embodiments is) a suitably-modified handheld mobile device selected from the group consisting of a cellular telephone, a smart phone, a laptop computer, a tablet computer, a Personal Digital Assistant (PDA), a music player, a gaming console, and virtual-reality glasses.

In some embodiments, the processor forms part of the mobile device. For example, in embodiments in which the mobile device comprises a computing device, such as a smart phone or a tablet computer, the processor may be the processor that operates the smart phone or tablet computer. As another example, in embodiments in which the mobile device comprises a vehicle, the processor may be a component of the circuitry of the vehicle.

In some embodiments, the processor is remote (especially, physically separate) from the mobile device. In some such embodiments, the mobile device additionally includes a transmitter for transmitting information to the processor and the processor comprises a receiver for receiving the inputs for calculation transmitted by the mobile device.

In some embodiments, the processor comprises a server.

In some embodiments, the processor comprises a mobile processing device. For example, in some embodiments, the mobile device including the imaging element comprises smart glasses, and the remote location comprises a smart phone including a processor. As another example, the mobile device may be a remotely-controlled vehicle (e.g., toy, drone), and the processor may form part of a remote control unit held by a user of the vehicle.

In some embodiments, the transmitter of the mobile device and the receiver of the processor communicate using a suitable communication method. The communication method may be any suitable communication method, including wired communication methods such as communication over a Wide Area Network (WAN) or a Local Area Network (LAN), or a wireless communication method such as communication using (ultra) sonic communication, infrared communication, over a Wi-Fi network (e.g., in a Wi-Fi session), Bluetooth® communication protocol, and communication using wireless telephony methods such as GSM, 2G, 3G, and 4G.

The imaging element may be any suitable imaging element operating at any suitable imaging rate. That said, in some embodiments, the imaging element comprises a still camera. In some embodiments, the imaging element comprises a video camera. In some embodiments, the imaging rate is not slower than 10 frames per second. In some embodiments, the imaging rate is not slower than 20 frames per second, not slower than 30 frames per second, not slower than 40 frames per second, not slower than 50 frames per second, or even not slower than 100 frames per second.

In some embodiments, the portion of the specified area includes a ceiling of the specified area, and the imaging element captures images of at least part of the ceiling of the portion of the specified area.

In some embodiments, the anchors comprise light sources located in the specified area. In some embodiments, the light sources are located on the ceiling of the specified area. In some embodiments, the light sources are located on the walls of the specified area.

In some embodiments, the processor is configured to identify at least three, at least four, at least five, or even ten anchors or more in each of the at least two captured images.

In some embodiments, the processor is configured to identify the same at least two anchors in each of the at least two captured images. In some embodiments, the processor is configured to identify the same at least two anchors in at least three, at least four, at least five, and even in at least ten images captured by the imaging element.

In some embodiments, the processor is configured to use edge-detection methods to identify the anchors. In some embodiments, the processor is configured to use brightness-detection methods, such as brightest pixel detection and/or darkest pixel detection to identify the anchors.

In some embodiments, the processor is configured to employ image-registration methods for identifying the changes in relative location of the at least two identified anchors.

In some embodiments, the orientation-measurement element comprises a gyroscope. In some embodiments, the three-dimensional orientation is defined in terms of at least one of yaw, pitch, and roll of the mobile device. In some embodiments, the three-dimensional orientation is defined in a three-axis environment as angular distances from the X, Y, and Z, axes of a Cartesian coordinate system.

In some embodiments that include a velocity-sensing element, the velocity-sensing element comprises an accelerometer. In some embodiments, the velocity-sensing element comprises a pedometer functionally associated with a clock.

In some embodiments that include a direction-sensing element, the direction-sensing element comprises a compass. In some embodiments, the direction-sensing element comprises a gyroscope. In some embodiments, the direction-sensing element comprises an optic flow sensor.

In some embodiments, the data received from at least one of a velocity-sensing element of the mobile device and a direction-sensing element of the mobile device used to determine a motion vector for the mobile device comprises at least one of a velocity of the mobile device and a direction of motion of the mobile device. In some embodiments, the motion vector comprises both a velocity and a direction of motion of the mobile device.

In some embodiments, the processor is configured to compute the distance and the direction traveled by the mobile device by computing the distances between the mobile device and each of the identified anchors in each of the at least two images taking into consideration the three-dimensional orientation of the mobile device, and based on changes in the computed distances, to identify location and/or the direction and the distance traveled by the device.

In some embodiments, the imaging element is configured to capture each of the at least two images when the mobile device is at a different three-dimensional orientation. In some such embodiments, the processor is configured to compute the location and/or distance and direction taking into consideration the three-dimensional orientation of the mobile device and/or imaging element at the time of capturing each of the images.

In some embodiments, the mobile device comprises (and in some embodiments is) an unmanned, autonomous or robotic vehicle such as an unmanned terrestrial vehicle or unmanned aerial vehicle, and the specified area comprises a volume (e.g., room) in which the vehicle is moving.

In some embodiments, the mobile device comprises (and in some embodiments is) a vehicle (manned or unmanned), and the specified area comprises a tunnel through which the vehicle is travelling.

In some embodiments, the processor is configured to compute the distance traveled by the device within the specified area to an accuracy of 10 cm or less per calculation cycle.

In some embodiments, the processor is configured to compute the location of the device within the specified area to an accuracy of 10 cm or less per calculation cycle.

In some embodiments, the processor is configured to create a map of identified anchors, and the assembly also includes a storage device, functionally associated with the processor, configured to store identified locations of identified anchors and the created map of the anchors in the specified area. In some such embodiments, the storage device comprises a mapping database. In some embodiments, the storage device forms part of the mobile device. In some embodiments, the storage device forms part of the processing unit. In some embodiments, the storage device is separate from the mobile device and from the processing unit.

In some such embodiments, the processor is also configured to upload locations of identified anchors and/or a created map of identified anchors to the storage device. In some such embodiments, the processing unit includes a transmitter and the processor is configured to employ the transmitter to upload the locations and/or created map to the storage device. In some such embodiments, the transmitter comprises a wireless transmitter operative to use any suitable wireless communication method, including (ultra) sonic, infrared, Wi-Fi, Bluetooth®, and wireless telephony protocols such as GSM, 2G, 3G, and 4G.

In some embodiments, the processor is also configured to obtain a map of anchors located in the specified area. In some such embodiments, the processor is configured to obtain the map by wirelessly receiving the map from a different mobile device which has already mapped the anchors. In some such embodiments, the processor is configured to obtain the map by downloading the map from a remote location such as a mapping database where the map is stored. In some such embodiments, the processor is configured to update the obtained map of the anchors for potentially improving future computation based on the map.

In some embodiments, the mobile device and/or the processor is also configured to identify a landmark in the specified area. In some such embodiments, the landmark is an easily identifiable item or object which allows the processor and/or the mobile device to accurately know the position of the mobile device. For example, the landmark may be a unique arrangement of anchors or a geographical landmark found in an image.

In some such embodiments, in addition to computing the direction and distance traveled by the mobile device, the processor is also configured to compute the location of the mobile device relative to the identified landmark. In some embodiments, the landmark is identified prior to capturing the images.

In some embodiments, the processor is configured to identify the landmark in one of the at least two images. In some embodiments, the mobile device and/or the processor is configured to identify the landmark by processing one or more images to identify the landmark, such as by scanning and decoding a Quick Response (QR) code located at the landmark or processing an image to identify a unique aspect of the environment at the landmark, such as a unique chandelier. In some embodiments, the mobile device is configured to identify the landmark by receiving a signal indicating presence at or near the landmark. For example, the landmark may be a Wi-Fi access point, such that the mobile device identifies the landmark by receiving a beacon from the Wi-Fi access point at the landmark. As another example, the landmark may be identified by receipt of an RF or Bluetooth® signal by the mobile device.

In some embodiments, at least one of the mobile device and the processing unit is configured to display the computed location and/or distance and velocity to a user, for example overlaid on a map of the specified area. Typically, such displaying is to the human operator (i.e., user) of the mobile device.

Unless otherwise defined, all technical and scientific terms used herein have the same meaning as commonly understood by one of ordinary skill in the art to which the invention pertains. In case of conflict, the specification, including definitions, take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

As used herein, when a numerical value is preceded by the term "about", the term "about" is intended to indicate +/−10%.

Some embodiments of the invention may involve performing or completing selected tasks manually, automatically, or a combination thereof. Some embodiments of the invention are implemented with the use of components that comprise hardware, software, firmware or combinations thereof. In some embodiments, some components are general-purpose components such as general-purpose computers or processors. In some embodiments, some components are dedicated or custom components such as circuits, integrated circuits or software. For example, some embodiments are performed, at least partially, as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network (e.g., Internet, Intranet, wired, wireless) connection. In some embodiments, implementation includes a user interface, generally comprising one or more of input devices (e.g., allowing input of commands and/or parameters) and output devices (e.g., allowing reporting parameters of operation and results).

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted are not to scale.

In the Figures.

DESCRIPTION OF SOME EMBODIMENTS OF THE INVENTION

The invention, in some embodiments, relates to the field of mapping and location determination, and more particularly, but not exclusively, to methods, asssemblies and devices useful for assisting in accurately identifying the motion and/or location of a device in a specified area and mapping anchors in the specified area.

According to an aspect of some embodiments of the teachings herein, there is provided a method for determining the location of a mobile device in a specified area, comprising:

from an imaging element forming part of a mobile device, at an imaging rate, capturing at least two images of a portion of a specified area at different time points; in each of the at least two captured images, identifying at least two anchors located in the portion that are found in the at least two captured images;

processing the at least two images to identify changes in locations of the at least two identified anchors within the at least two images;

from an orientation-measurement element forming part of the mobile device, determining a three-dimensional orientation of the imaging element;

using data received from at least one of a velocity-sensing element of the mobile device and a direction-sensing element of the mobile device, determining a motion vector for the mobile device; and based on the identified changes in location of the at least two identified anchors in the at least two images, the motion vector, and the orientation of the mobile device, computing at least one of a location of the mobile device in the specified area and a distance and a direction travelled by the mobile device.

According to an aspect of some embodiments of the teachings herein, there is also provided an assembly for determining a location of a mobile device in a specified area, comprising:

a mobile device including:
an imaging element configured to capture, at an imaging rate, at least two images of a portion of a specified area at different time points;
an orientation-measurement element configured to determine a three-dimensional orientation of the mobile device; and
at least one of a velocity-sensing element configured to determine a velocity of motion of the mobile device and a direction-sensing element configured to determine a direction of motion of the mobile device; and
a processing unit, functionally associated with the mobile device, including a processor configured to:
in each the image, identify at least two anchors located in the portion of the specified area;
process the at least two images to identify changes in locations of at least two identified anchors in at least two images;
based on data received from at least one of the optional velocity-sensing element and the optional direction-sensing element, determine a motion vector for the mobile device; and
based on the identified changes in locations of at least two identified anchors in at least two images, the motion vector, and the orientation, compute at least one of a location of the mobile device in the specified area and a distance and a direction travelled by the mobile device.

The principles, uses and implementations of the teachings of the invention may be better understood with reference to the accompanying description and figures. Upon perusal of the description and figures present herein, one skilled in the art is able to implement the teachings of the invention without undue effort or experimentation. In the figures, like reference numerals refer to like parts throughout.

Before explaining at least one embodiment of the invention in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

Figure 1A:
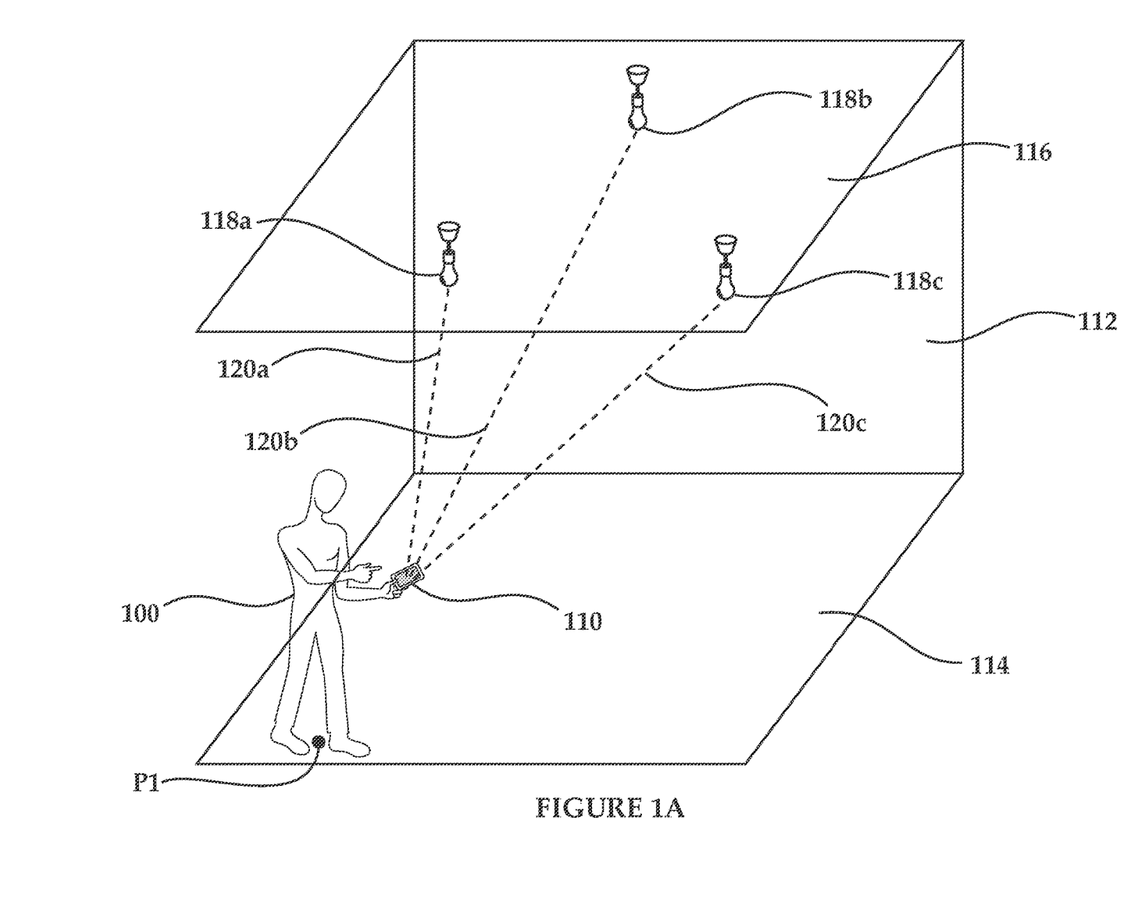
FIGS. 1A and 1B are schematic depictions of an embodiment of a method for determining the location and/or the motion of a mobile device in a specified area, carried out by a mobile device, according to the teachings herein.
Figure 1B:
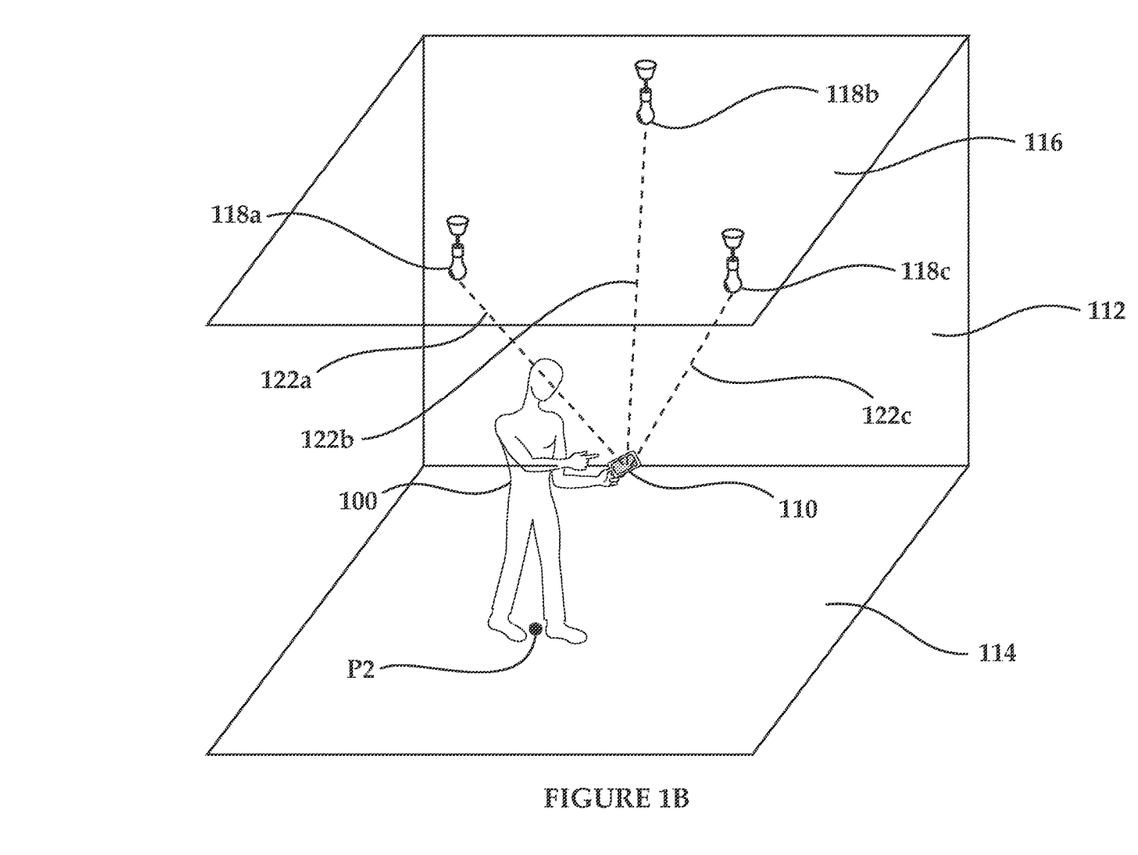
Figure 2A:
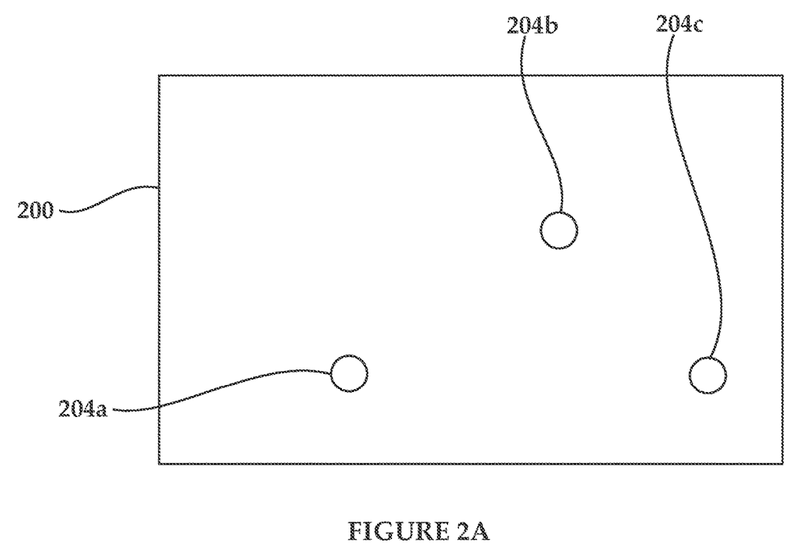
FIGS. 2A and 2B are schematic depictions of images captured by the mobile device carrying out the method of FIGS. 1A and 1B.
Figure 2B:
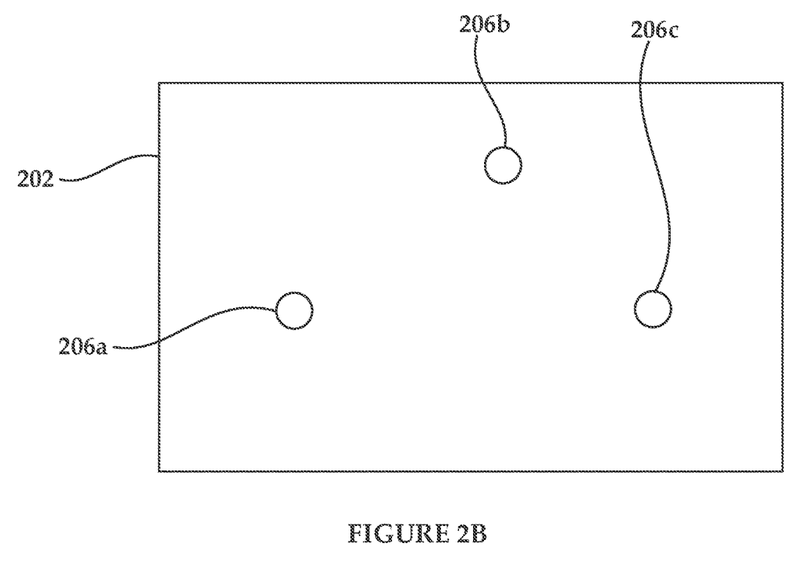

Reference is now made to FIGS. 1A and 1B, which are schematic depictions of an embodiment of a method for determining the location and/or the motion of a mobile device in a specified area, carried out by a mobile device, according to the teachings herein, and to FIGS. 2A and 2B, which are schematic depictions of images captured by the mobile device carrying out the method of FIGS. 1A and 1B.

As seen in FIGS. 1A and 1B, a user 100 holding a mobile device 110 is located in a specified area, here depicted as a room 112. User 100 is standing on a floor 114 of room 112, and a ceiling 116 of room 112 has light sources 118a, 118b, and 118c mounted thereon. As seen, in FIG. 1A user 100 is located in a first position P1 in room 112, whereas in FIG. 2B user 100 is located in a second position P2 in room 112.

In FIG. 1A, the distance between device 110 and light sources 118a, 118b, and 118c is identified by lines 120a, 120b, and 120c, whereas in FIG. 1B, the distance between device 110 and light sources 118a, 118b, and 118c is identified by lines 122a, 122b, and 122c. As can be clearly seen in the illustrated example, due to the movement of user 100 from point P1 to point P2, the distances 120a, 120b, and 120c, are not equal to distances 122a, 122b, and 122c.

As will be described in further detail hereinbelow with reference to FIGS. 3A-C, device 110 uses this change in distances between itself and the same set of light sources, here shown as light sources 118a, 118b, and 118c, to determine the distance and direction of motion by device 110, which is equivalent to the direction of motion and distance required for user 100 to get from point P1 to point P2. In some embodiments, such determination of distance and direction of motion of device 110 enables accurate identification of the location of device 110 in room 112.

As will be described hereinbelow with reference to FIGS. 3A-3C, an imaging element such as an on-board camera (not shown) of device 110 captures images of the surrounding area, and specifically, in the illustrated embodiment, of ceiling 116, at an imaging rate.

For example, FIGS. 2A and 2B represent images 200 and 202 captured by device 110 when user 100 was at point P1 and when the user was at point P2, respectively. As can be seen, image 200 shows the presence of light sources 118a, 118b, and 118c in illuminated portions 204a, 204b, and 204c, and image 202 shows the presence of light sources 118a, 118b, and 118c in illuminated portions 206a, 206b, and 206c.

As will be described hereinbelow with reference to FIGS. 3A-3C, device 110, or a processing unit functionally associated therewith, processes images 200 and 202 using registration techniques known in the art of image processing, to find a correspondence, or registration, between illuminated portions 204a, 204b, and 204c of image 200 and between illuminated portions 206a, 206b, and 206c of image 202.

Once such registration is found, device 110 or the processing unit associated with it notes the change in the relative location of the representation of light sources 118a, 118b, and 118c between images 200 and 202, and uses this information, together with information relating to its own three-dimensional orientation and with information relating to the motion vector of the device and/or information relating to a previous location at which the device 110 was present, to compute the distance and the direction traveled by device 110 and by user 100, and, in some embodiments, the current location of device 110.

Figure 3A:
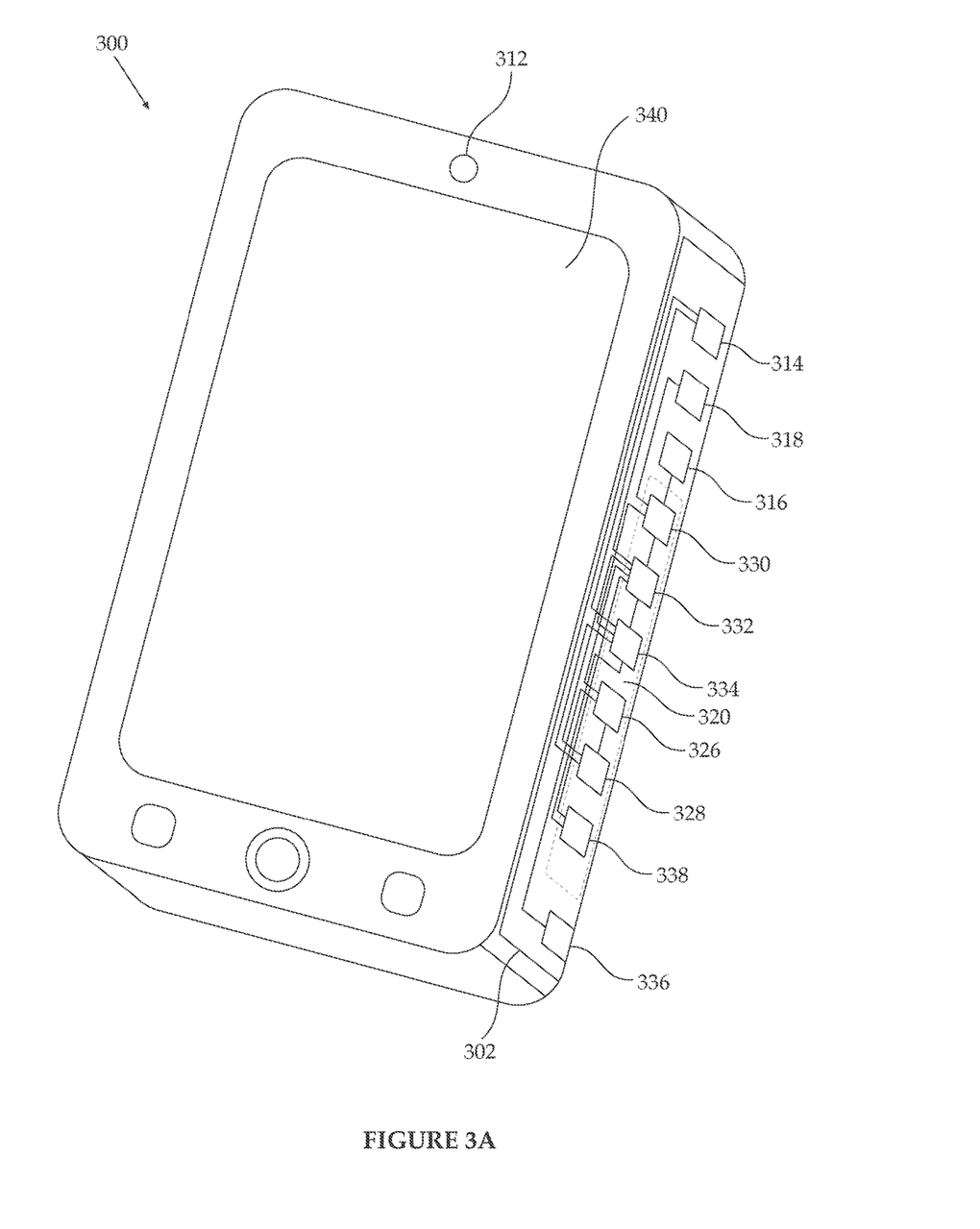
FIGS. 3A, 3B, and 3C are schematic depictions of embodiments of mobile devices and/or assemblies suited for carrying out the method of FIGS. 1A and 1B according to embodiments of the teachings herein.
Figure 3B:
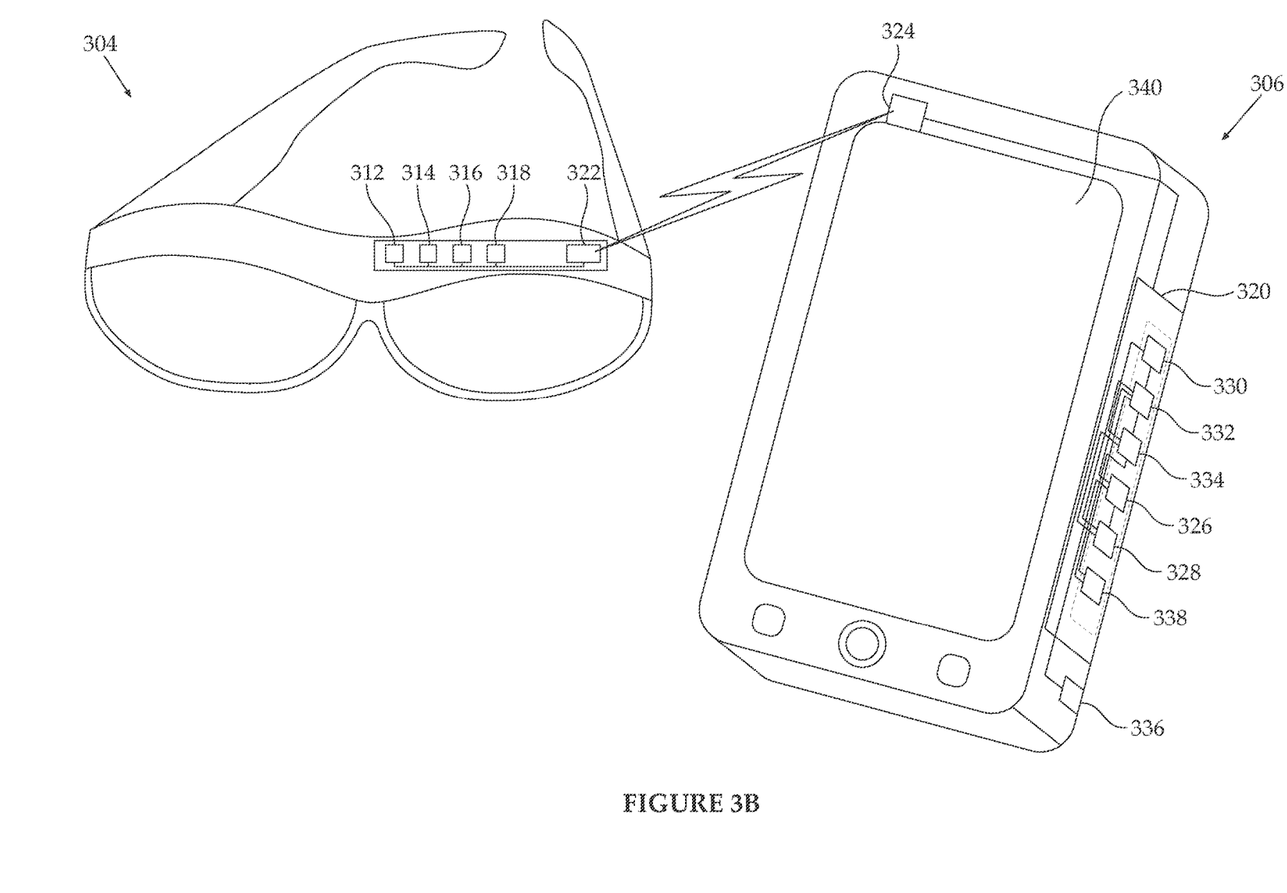
Figure 3C:
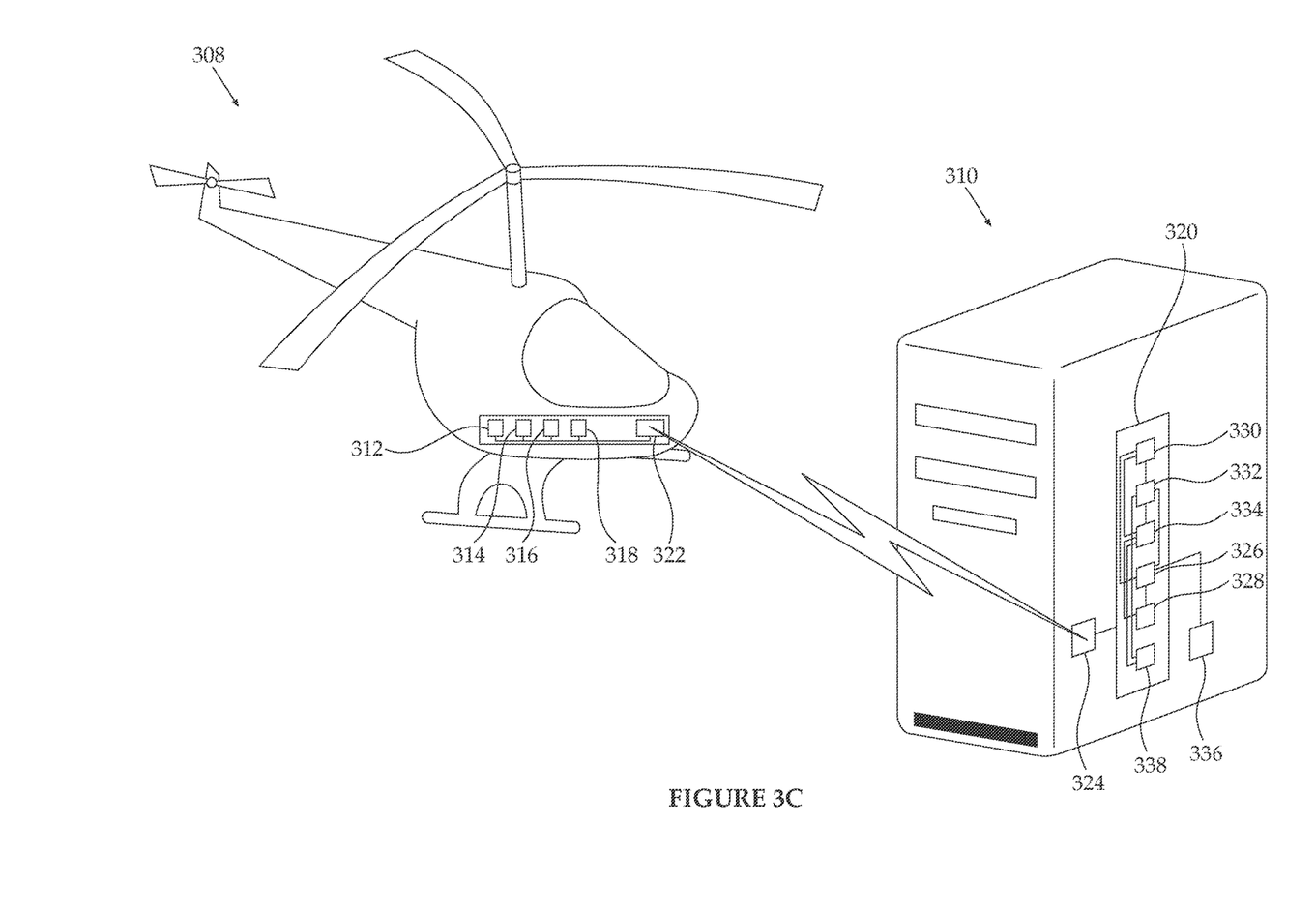

Reference is now made to FIGS. 3A, 3B, and 3C, which are schematic depictions of embodiments of mobile devices and/or assemblies suited for carrying out the method of FIGS. 1A and 1B according to embodiments of the teachings herein.

FIG. 3A shows a mobile device 300 here depicted as a smart-phone such as an iPhone 4S, commercially available from Apple® Inc. of Cupertino, Calif. USA, including a built-in processing unit 302.

FIG. 3B shows a mobile device 304, here depicted as smart glasses, such as Google® Glass® commercially available from Google® Inc. of Mountain View, Calif., USA, which are functionally associated with a nearby processing unit 306, here depicted as a smart phone such as an iPhone 4S. As will be described in further detail hereinbelow, mobile device 304 communicates with processing unit 306 using any suitable wireless communication method, such as Wi-Fi, Bluetooth®, and wireless telephony protocols. In use, mobile device 304 may be worn by a user, and processing unit 306 may be carried by the user, for example in a pocket or a bag, such that mobile device 304 and processing unit 306 remain in close proximity to one another during operation thereof.

FIG. 3C shows a mobile device 308, here depicted as an electronic toy helicopter, which is functionally associated with a remote processing unit 310, here depicted as a remote server. As will be described in further detail hereinbelow, mobile device 308 communicates with processing unit 310 using any suitable wireless communication method, such as infrared, Bluetooth®, R/C, ultrasonic, Wi-Fi and wireless telephony protocols.

As seen, each of mobile devices 300, 304, and 308 includes an imaging element 312 configured to capture images of the environment of the mobile device at an imaging rate. Imaging element 312 may be any suitable imaging element operating at any suitable imaging rate. That said, in some embodiments, imaging element 312 comprises a still camera, such as an 8-megapixel iSight camera available in an iPhone 4S, or any other suitable camera. In some embodiments, the imaging element comprises a video camera. In some embodiments, the imaging rate is not slower than 10 frames per second. In some embodiments, the imaging rate is not slower than 20 frames per second, not slower than 30 frames per second, not slower than 40 frames per second, not slower than 50 frames per second, or even not slower than 100 frames per second.

Each of mobile devices 300, 304, and 308 further includes an orientation-measurement element 314, such as a gyroscope, configured to determine the three-dimensional orientation of the mobile device. The three-dimensional orientation may be defined in terms of yaw, pitch, and roll, or alternately may be defined in a three-axis environment as angular distances from the X, Y, and Z, axes of a Cartesian coordinate system.

A velocity-sensing element 316 of each of mobile devices 300, 304, and 308 is configured to determine the velocity of the mobile device when it is in motion. In some embodiments, velocity-sensing element 316 comprises an accelerometer, whereas in other embodiments, particularly in embodiments in which the mobile device is configured to be worn or carried by a user, such as in the embodiments of FIGS. 3A and 3B, velocity-sensing element 316 comprises a pedometer associated with a clock (not shown) and configured to identify the velocity of a user holding and/or wearing the mobile device based on the length of the user's step and on the number of steps taken in a given time period. In some embodiments, mobile devices 300, 304, and 308 also include a direction-sensing element 318, such as a compass, which is configured to identify a direction in which the mobile device is being moved.

Each of mobile devices 300, 304, and 308 functions by operation of a processor 320 forming part of each of processing units 302, 306, and 310, respectively. Processor 320 is functionally associated with imaging element 312, orientation-measurement element 314, velocity-sensing element 316, and direction-sensing element 318.

As seen in FIGS. 3B and 3C, the functional association between processor 320 and imaging element 312, orientation-measurement element 314, velocity-sensing element 316, and direction-sensing element 318 is achieved by wireless communication between a transmitter 322 forming part of mobile devices 304 and 308, and a receiver 324 forming part of processing units 306 and 310. Transmitter 322 is configured to receive data from imaging element 312, orientation-measurement element 314, velocity-sensing element 316, and direction-sensing element 318, and to wirelessly transmit the data to receiver 324, which in turn is configured to transfer the received data to processor 320 for processing. As will be described hereinbelow, in some embodiments, each of transmitter 322 and receiver 324 may be configured to function as transceivers, so as to allow bidirectional communication between the mobile device and the processing unit.

An anchor-detection module 326, for example implemented as a separate process or thread running in processor 320, is configured to process images captured by imaging element 312 and to identify anchors located in the images. The anchors may be any suitable anchors fixed to locations around the area, such that a plurality of such anchors enables location determination as described hereinbelow. However, as described in further detail hereinbelow, the anchors are typically light sources located on the ceiling and/or the walls of a specified area in which mobile device 300, 304, and/or 308 are located. In some embodiments, anchor-detection module 326 utilizes an edge-detection algorithm as known in the art of image processing for identifying anchors in images captured by imaging element 312. In some embodiments, anchor-detection module 326 utilizes a brightness-detection algorithm as known in the art of image processing for identifying anchors in images captured by imaging element 312. Such brightness-detection algorithms are particularly suitable when the anchors are the brightest pixels in the captured images, such as light sources, or when the anchors are the least-bright pixels in the captured images.

An anchor-registration module 328, for example implemented as a separate process or thread running in processor 320, is configured to process at least two images captured by imaging element 312 and to register identified anchors in the at least two images in order to identify the location of each specific anchor in each of the images, and to compute the changes in the relative locations of the anchors within the images. Typically, this computation is carried out using image-registration algorithms as known in the art of image processing.

It is appreciated that typically, a single anchor is not sufficient for accurate image-registration. However, image-registration is accurate when multiple anchors are present in the images for which registration is required.

A motion-vector determining module 330, forming part of processor 320, employs the velocity as identified by velocity-sensing element 316 and/or the direction of the mobile device as captured by directions sensing element 318 to compute a motion vector for the mobile device.

A distance-determining module 332, for example implemented as a separate process or a thread running in processor 320, is configured to use the motion vector computed by motion-vector determining module 330, the orientation of the mobile device as determined by orientation measuring element 314, and the anchors identified by anchor-detection module 326 in a single image captured by imaging element 312 to compute the distances between mobile device and each such identified anchor at the time point in which an image was captured. It is appreciated that such distances vary not only based on the positioning of the mobile device within the specified area, but also taking into consideration the three-dimensional orientation of the mobile device at a given position.

Finally, a motion-determining module 334, for example implemented as a separate process or a thread running in processor 320, is configured to use the changes in the distances to each specific anchor computed by distance-determining module 322 with respect to different images captured by imaging element 312 at different time points, which specific anchor is registered between the different images by anchor-registration module 328, as well as the motion vector determined by motion-vector determining module 330, and the orientation of the mobile device as determined by orientation measuring element 314, to compute the distance and direction traveled by the mobile device in the time between capturing the different processed images.

It is appreciated that typically, a single anchor is not sufficient for accurately identifying the direction and distance of motion of any one of mobile devices 300, 304, and 308. However, motion, and, in some embodiments, also location, can be accurately determined when multiple anchors are used.

Naturally, once the distance and direction of motion of the mobile device in a given time period is known, the velocity of the mobile device may easily be calculated.

In some embodiments, processing unit 302, 306, and/or 308 is configured to store locations of anchors identified by anchor-identifying module 326 to a storage device such as a database, in order to generate or to update a map of the anchors located in an area in which the mobile device is located. In some embodiments, the storage device comprises a database 336 forming part of the processing unit and functionally associated with processor 320. In some embodiments, the storage device is remote from the processing unit, for example located in a remote server, and the identified anchor locations are transmitted to the storage device from the processing unit via a suitable transmitter or transceiver. For example, in embodiments in which transmitter 324 comprises a transceiver, the transceiver 324 may be used to transmit the anchor locations to the storage device. In embodiments in which the processing unit forms part of the mobile device, such as the embodiment of FIG. 3A, a dedicated transmitter (not shown) forming part of the mobile device 300 may be used to transmit the anchor locations identified by anchor-identifying module 326 to the remote storage device.

In some embodiments in which database 336 forms part of the processing unit, database 336 may be populated by a map of anchors obtained from a source external to the processing unit, such as a map of anchors received from another mobile device via wireless communication methods, or a map of anchors downloaded from an appropriate source directly by processing unit 302, 306, or 310, and/or by the mobile device 300, 304, or 308, for example from a server located at the entrance to the area in which the mobile device is located. In embodiments in which the mobile device and processing unit are physically separate from one another, such as in the embodiments of FIGS. 3B and 3C, the map of anchors may be transmitted from the mobile device where it was downloaded to the processing unit via transmitter 322 and receiver 324.

In some embodiments, mobile device 300, 304, and/or 308 includes a landmark-capturing module (not shown), configured to capture a known landmark in the area in which the mobile device is located. A landmark may be any identifiable object or item which allows mobile device 300, 304, or 308, or the processing unit functionally associated therewith, to accurately know the position of the mobile device.

For example, a landmark may be obtained from an image captured by imaging element 312, such as a unique arrangement of anchors or a geographical landmark found in an image, or a QR code scanned by the mobile device or captured by imaging element 312. It is appreciated that in embodiments in which the processing unit is physically separate from the mobile device, such as the embodiments of FIGS. 3B and 3C, such a landmark would be captured by the landmark-capturing module in the mobile device, and would be identified by a landmark identifying module (not shown) forming part of the processing unit.

As another example, the landmark may be identified by a signal received at the mobile device or at the processing unit associated therewith, if the processing unit is proximate the mobile device. For instance, at the entrance to a conference hall there may be a Wi-Fi access point transmitting beacon signals indicating its presence, and receipt of such a beacon signal by the mobile device and/or by the processing unit associated with the mobile device would enable the mobile device and the associated processing unit to accurately know the location of the mobile device—at the entrance of the hall.

Once such a known landmark is identified a location computing module 338 may use the distance and direction computed by distance-determining module 332 and/or the motion computed by motion-determining module 334, together with the location of the known landmark, to compute the location of the mobile device relative to the identified landmark, and thereby to provide a system for indoor positioning of the mobile device relative to the known landmark.

For example, in some embodiments, the mobile device forms part of, or is mounted in or on, a vehicle, and the specified area is a tunnel. Once the entrance to the tunnel is recognized (for example by image processing of an image depicting the arch indicating the entrance to the tunnel), location computing module 338 can use the distance travelled by the mobile device to determine the exact location of the vehicle within the tunnel. This may be particularly useful for emergency service providers, such as emergency medical personnel and/or firefighters.

Additionally, in some embodiments, given a map of known locations of anchors, location computing module 338 can use the map to identify the current location of the mobile device, even without knowing a specific location at which the mobile device was located previously, or the location of a landmark.

In some embodiments, at least one of the mobile device and the processing unit comprises a display 340, and the distance and direction computed by distance-determining module 332 and/or the location computed by location computing module 338 are displayed to a user of the mobile device on display 340.

As mentioned hereinabove, in some embodiments, processing unit 302, 306, and/or 310 includes a wireless transmitter or transceiver, such as transceiver 324 of FIGS. 3B and 3C, and the location computed by location computing module 338 is transmitted to a remote location via the wireless transmitter. For example, the computed location may be transmitted to a remote server for provision of suitable advertising material based on the specific location of the mobile device.

In some embodiments, in which the processing unit is physically separate from the mobile device, such as in the embodiments of FIGS. 3B and 3C, the computed location is also transmitted to the mobile device, for display thereon and/or for control of further motion of the device. For example, an aerial vehicle, such as helicopter 304, can hover in one place if it knows its location, and compensates for drift based on the known location. Such a toy can make sure to always be imaging the same three or more anchors, thereby allowing it to remain in a single place based on triangulation.

It is further appreciated that mobile devices 300, 304, and 308 may be at different heights relative to the anchors used for distance and direction computation, and thus the distance between each of mobile devices 300, 304, and 308 and the anchors is affected by the exact height at which the mobile device is positioned or located. Therefore, in some embodiments, distance-determining module 332 includes a mechanism for accounting for changes in the vertical distance between the mobile device and the anchors, and such changes are taken into account in distance computation and in the computation of direction and distance traveled by the mobile device as computed by motion-determining module 334.

It is additionally appreciated that mobile devices 300, 304, and 308 may be at different three-dimensional orientations in terms of yaw, pitch, and roll, at different times during computation. Such changes in the orientation of the mobile device change the orientation, and therefore the field of view, of imaging element 312 during operation thereof, and therefore assist in identification of the location of the mobile device. This is due to the fact that the change in orientation "breaks" the symmetry of the anchors captured in each of the images, particularly in settings where the anchors are highly symmetrical, such as in different aisles in a large store.

For example, in many large stores, such as supermarkets, the light sources are symmetric and are placed in the same positions in each of the aisles in the store. A change in the three-dimensional orientation of the mobile device and of imaging element 312 when capturing images, allows for a different set of anchors, or light sources, to be seen in each of the images, thereby breaking the symmetry between the images and enabling computation of the exact aisle in which the mobile device is located, even without making reference to a landmark or a previously known location of the mobile device.

Furthermore, as mentioned above with respect to the height of the mobile devices 300, 304, and 308, the distance between the mobile devices and each of the imaged anchors is affected by the exact orientation of the imaging element. Therefore, distance-determining module 332 utilizes input from the orientation measuring element 314, as well as a mechanism for accounting for changes in the three-dimensional orientation of the mobile device, and such changes are taken into account in distance computation and in the computation of direction and distance traveled by the mobile device as computed by motion-determining module 334.

Figure 4:
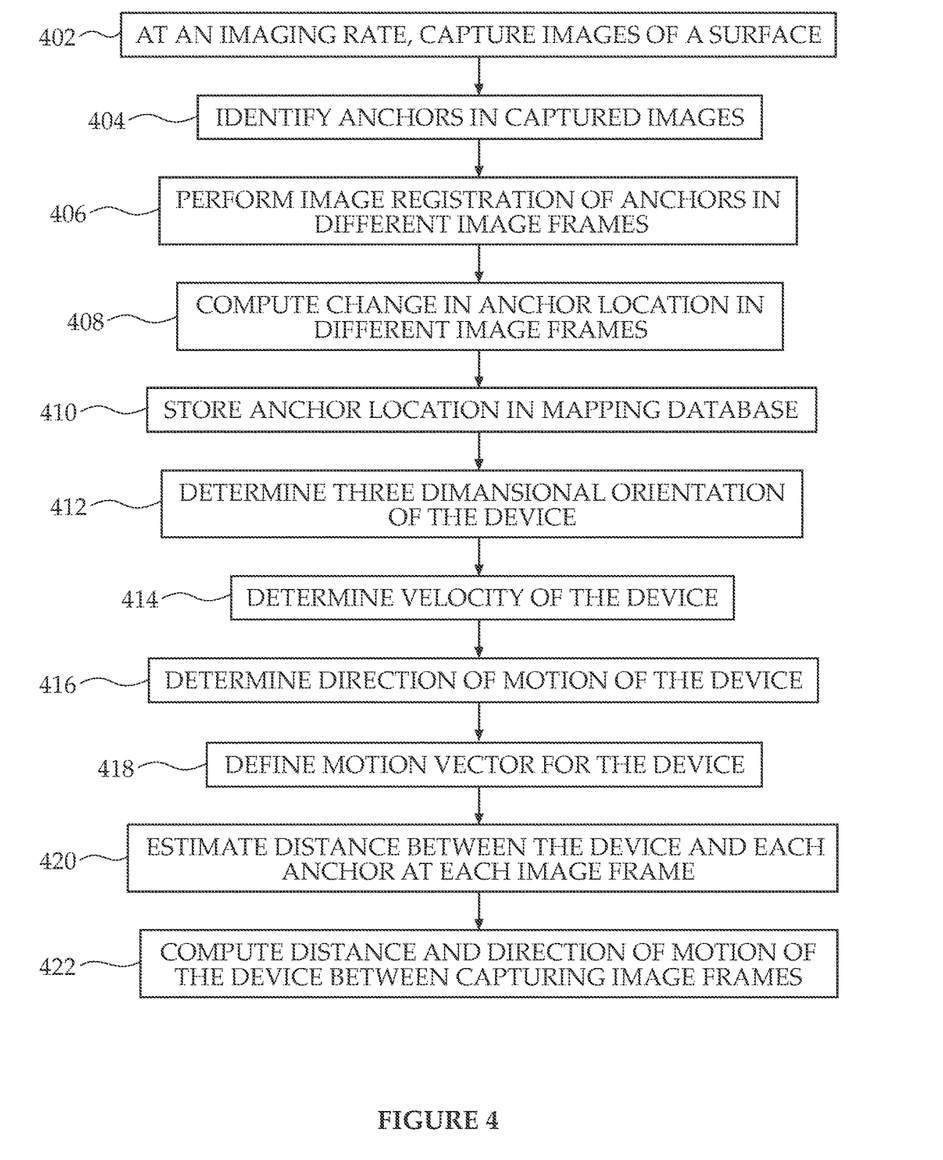
FIG. 4 is a flow chart of an embodiment of a method for determining the location and/or the motion of a mobile device and/or assembly in a specified area according to the teachings herein.

Reference is now made to FIG. 4, which is a flow chart of an embodiment of a method for determining the location and/or the motion of a mobile device and/or assembly in a specified area according to the teachings herein.

As seen in FIG. 4, an imaging element, such as imaging element 312 of FIGS. 3A-3C, captures images of one or more surfaces in a specified area in which a suitable mobile device, such as device 300, 304, or 308 of FIGS. 3A-3C, is located, at an imaging rate, as indicated at reference numeral 402.

A processor, such as processor 320 of FIGS. 3A-3C, processes the captured images to identify anchors in each captured image, at reference numeral 404, after receiving the images from the imaging element, either directly or by wireless transmission, as described hereinabove. As described hereinabove, the anchors may be light sources, or any other repetitively appearing anchors which are present on the surfaces being imaged and which can be identified by the processor.

At reference numeral 406, the processor compares images captured by the imaging element at different times, and performs registration between anchors identified in at least two of the captured images, using image-registration techniques well known in the art of image processing. Once image-registration between anchors in different captured images frames is found, the change in relative location of each anchor within the images is computed, at reference numeral 408.

In some embodiments, the locations of the anchors are stored in a database, at reference numeral 409. As mentioned above, the database may be part of the mobile device, part of a processing unit associated with the device, or at a remote location such as a remote server.

Subsequent to, or concurrently with, capturing of the images by the imaging element, an orientation-measurement element, such as orientation-measurement element 314 of FIGS. 3A-3C, determines the three-dimensional orientation of the mobile device, at reference numeral 410.

At reference numeral 412, a velocity-sensing element, such as velocity-sensing element 316 of FIGS. 3A-3C, determines the velocity of the device. At reference numeral 414, a direction-sensing element, such as velocity-sensing element 318 of FIGS. 3A-3C, determines the direction in which the device is moving.

Based on the determined velocity and direction, the processor of the device defines a motion vector for the device, at reference 416. The processor then uses the motion vector, the orientation, and the identified anchors to compute or estimate the distance between the device and each identified anchor at each time point, at reference numeral 418.

Finally, at reference numeral 420, the changes in the distances between the device and the anchors at different time points, together with the motion vector and the orientation, are used by the processor to determine the distance and direction of motion of the device between the different time points, as described hereinabove with reference to FIGS. 3A-3C.

In some embodiments, a device of any of FIGS. 3A, 3B and 3C can be used as an anchor-mapping device. For example, a device may be moving through an area to be mapped such that at any given point in time it is in a known position (for example using a different indoor or outdoor positioning system). Thus, for each frame captured by the imaging element, the position of the device is known, and based on the distance or angular distance between the device and each anchor identified in the frame, the exact location of the anchor can be determined. The determined location of the anchor can then be stored in a map or database, as described hereinabove.

In some embodiments, a device of any of FIGS. 3A-3C does not include a velocity sensor, but captured images of anchors are used to compute a velocity of the device. For example, if the locations or distances between anchors are known, the distance travelled by the device in a specific time window can be computed based on the specific anchors seen, or the number of anchors seen, in that time window, which naturally enables computation of the velocity at which the device is moving.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention. Section headings are used herein to ease understanding of the specification and should not be construed as necessarily limiting.

The invention claimed is:

1. A method of indoor navigation using a mobile device, which method comprising:
    determining an indoor specified area in which the mobile device is located using a received indoor wireless transmission;
    downloading a light sources map of indoor real light sources of said indoor specified area based on and in response to said determining an indoor specified area in which the mobile device is located using a received indoor wireless transmission;
    detecting a one or more indoor real light sources in said indoor specified area using an optical sensor of said mobile device;
    measuring a rotation orientation of said mobile device using an orientation sensor, to determine a rotation orientation of said mobile device when said detecting said one or more indoor real light sources;
    determining a spatial relationship between said one or more detected indoor real light sources and said mobile device, based on signals received by said optical sensor and said measured rotation orientation of said mobile device;
    accurately determining a position of said mobile device within said determined indoor specified area using said downloaded indoor real light sources map, said signals received by said optical sensor and said spatial relationship that was determined based on said measured rotation orientation.

2. The method of claim 1, wherein said determining a position comprises identifying said one or more real light sources detected by said optical sensor in said real light sources map.

3. The method of claim 1, wherein said detecting comprises acquiring an image of at least one real light source.

4. The method of claim 3, wherein said detecting comprises brightness-detection methods.

5. The method of claim 3, wherein said detecting comprises edge-detection methods.

6. The method of claim 1, wherein said detecting comprises detecting at least two real light sources.

7. The method of claim 1, wherein said relationship comprises a distance.

8. The method of claim 1, wherein said measuring rotation orientation comprises measuring angular distances from X, Y, and Z axes.

9. The method of claim 1, wherein said detecting comprises detecting at least one real light source at different times;
    wherein said determining a position comprises identifying changes in relative locations of said least one real light source.

10. The method of claim 9, wherein said determining a position comprises determining a motion vector of said device.

11. The method of claim 1, wherein said real light sources map is downloaded from a remote database.

12. The method of claim 1, comprising:
    identifying one or more real light sources detected by said optical sensor in said real light sources map;
    determining a position of said at least one real light source in said specified area; and
    updating said real light sources map using said real light source position.

13. The method of claim 12, wherein said updating comprises updating a remote database.

14. The method of claim 1, wherein said wireless transmission is a Wi-Fi signal.

15. The method of claim 1, wherein said wireless transmission is an RF signal.

16. The method of claim 1, wherein said wireless transmission is a Bluetooth® signal.

17. The method of claim 1, comprising providing advertising information based on said position.

18. The method of claim 1, wherein said one or more real light sources comprise electric light sources.

19. The method of claim 1, wherein said accurately determining comprises accurately determining a position of said mobile device within said determined indoor specified area on said downloaded indoor real light sources map.

20. The method of claim 1, wherein said indoor real light sources are light sources fixed to a ceiling in said indoor specified area.

21. The method of claim 1, wherein said measuring rotation orientation comprises measuring rotation orientation of said mobile device using an orientation sensor comprising a gyroscope, and using a signal from said gyroscope to measure said orientation of said mobile device.

22. The method of claim 1, wherein said measuring rotation orientation of said mobile device comprises measuring one or more of yaw, pitch and roll of said mobile device, to determine a rotation orientation of said mobile device when said detecting said one or more indoor real light sources.

23. A method of indoor navigation using a mobile device, which method comprising:
   determining an indoor specified area in which the mobile device is located using a received indoor wireless transmission;
   downloading a light sources map of indoor real light sources of said indoor specified area based on and in response to said determining an indoor specified area in which the mobile device is located using a received indoor wireless transmission;
   detecting a one or more indoor real light sources in said indoor specified area using an optical sensor of said mobile device;
   measuring a rotation orientation of said mobile device using an orientation sensor comprising a gyroscope, to determine a rotation orientation of said mobile device when said detecting said one or more indoor real light sources;
   determining a spatial relationship between said one or more detected indoor real light sources and said mobile device, based on signals received by said optical sensor and said measured rotation orientation of said mobile device;
   accurately determining a position of said mobile device within said determined indoor specified area using said downloaded indoor real light sources map, said signals received by said optical sensor and said spatial relationship that was determined based on said measured rotation orientation.

* * * * *